United States Patent
Yamashita et al.

(10) Patent No.: US 9,036,211 B2
(45) Date of Patent: May 19, 2015

(54) LIGHT EMITTING APPARATUS, MANUFACTURING METHOD FOR THE LIGHT EMITTING APPARATUS, PRINTER, AND MANUFACTURING METHOD FOR THE PRINTER

(71) Applicant: CANON KABUSHIKI KAISHA, Tokyo (JP)

(72) Inventors: Takanori Yamashita, Hachioji (JP); Masami Iseki, Mobara (JP); Kouji Ikeda, Inagi (JP); Shuhei Takahashi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/203,361

(22) Filed: Mar. 10, 2014

(65) Prior Publication Data

US 2014/0268239 A1 Sep. 18, 2014

(30) Foreign Application Priority Data

Mar. 13, 2013 (JP) ................................. 2013-050557

(51) Int. Cl.
*G06K 15/00* (2006.01)
*G06K 15/14* (2006.01)

(52) U.S. Cl.
CPC ............ *G06K 15/4015* (2013.01); *G06K 15/14* (2013.01)

(58) Field of Classification Search
None
See application file for complete search history.

(56) References Cited

U.S. PATENT DOCUMENTS

| 6,229,506 | B1 | 5/2001 | Dawson | |
|---|---|---|---|---|
| 2002/0190973 | A1* | 12/2002 | Morita | ........................... 345/204 |
| 2007/0063932 | A1* | 3/2007 | Nathan et al. | ................... 345/76 |

* cited by examiner

*Primary Examiner* — Quang N Vo
(74) *Attorney, Agent, or Firm* — Canon USA, Inc. IP Division

(57) ABSTRACT

A light emitting apparatus including: a plurality of light emitting elements; a drive circuit including a transistor and a capacitor having one end connected to a gate of the transistor; and a signal supply circuit for receiving a digital gradation signal and outputting an analog voltage signal to the drive circuit, including a computation circuit configured to correct the input digital gradation signal to generate a corrected digital gradation signal, in which the drive circuit is configured to conduct an auto-zero operation which reduce the gate-source voltage of the transistor to a threshold voltage by flowing the drain current to the capacitor, and the computation circuit is configured to generate the corrected digital gradation signal by multiplying a correction coefficient to the input digital gradation signal subtracted by a particular signal common to the plurality of light emitting elements.

20 Claims, 13 Drawing Sheets

LIGHT EMITTING APPARATUS, MANUFACTURING METHOD FOR THE LIGHT EMITTING APPARATUS, PRINTER, AND MANUFACTURING METHOD FOR THE PRINTER

BACKGROUND OF THE INVENTION

1. Field of the Invention

The present invention relates to a light emitting apparatus and a printer. The invention particularly relates to a light emitting apparatus including plural light emitting elements and a printer using the light emitting apparatus.

2. Description of the Related Art

A light emitting apparatus in which plural light emitting elements are arranged in a line manner or in a matrix is developed and commercialized for products like a display apparatus, a lighting apparatus, an exposure light source of an electrophotographic printer, or the like. The emitted light amounts of the light emitting elements are designed to be uniform in the apparatus including the plural light emitting elements.

In a display apparatus having a display surface where the light emitting elements are arranged in a matrix, when the light amounts, that is, luminances on the display surface are not uniform, a color irregularity occurs, or an image looks like having surface roughness.

In the electrophotographic printer including the exposure light source where the light emitting elements are arranged in a line manner, a luminance variation between the light emitting elements appears as a streak irregularity on a printed image and decreases a quality of the printed image.

A cause of the nonuniformity of the light amounts is not only a characteristic variation of the light emitting elements. A drive circuit configured to supply a drive current is attached to each of the light emitting elements. If characteristics of transistors included in the drive circuits are varied, currents are not uniform resulting in nonuniformity of the light amounts of the light emitting elements.

A drive circuit configured to compensate a variation of threshold voltages of the transistors is proposed in U.S. Pat. No. 6,229,506 (FIG. 3) and US2007/0063932 (FIGS. 1A, 4A, and 5A). The variation of the threshold voltages is absorbed in the drive circuit, and currents that do not rely on the threshold voltages are generated.

Even if the variation of the threshold voltages of the transistors is compensated, a variation of carrier mobility of semiconductor materials constituting the transistors would cause the current nonuniformity. In addition, even when all the current nonuniformity is removed by further improvement of the drive circuit, if light emitting efficiencies of the light emitting elements are not uniform, the variation in the light amount remains. When the light emitting elements are used as an exposure apparatus of the printer, a photosensitive member is irradiated with the emitted light through a lens array and optical nonuniformity of the lens array is added to the variation in the light amount.

As another method of eliminating the nonuniformity of the light amounts, it is conceivable to measure the light amounts of the light emitting elements and correct the image data input to the drive circuit on the basis of the measured light amounts. This method is called external correction since the correction is not performed within the drive circuit as described above. US Patent Application no. 2005/0190255 discloses an invention of the electrophotographic printer having an exposure head in which a deviation from a standard value of the light amounts of the light emitting elements is measured to correct a gradation signal using a correction table.

According to the external correction system, a correction parameter determined on the basis of the measured value of the light amount is stored in a memory for each light emitting element, and image data is corrected on the basis of this correction parameter.

The image data is normally transmitted from an external device such as a computer in a form of a digital signal. The image data is a signal for specifying the light amount of the light emitting element including gradation information for specifying an intermediate light amount in addition to turning-on and turning-off of the light.

The gradation signal is corrected in a correction circuit. The correction circuit is provided with a circuit configured to perform a correction computation or a look-up table in which a correction value is determined for each level of the gradation signal. The correction circuit corrects the input gradation signal to another digital gradation signal. The same number of the look-up tables are provided as the light emitting elements and saved in the memory.

The corrected gradation signal is converted into an analog voltage signal by a digital-to-analog converter (hereinafter, which will be referred to as DA converter). The DA converter is a circuit configured to decode the digital signal and output a voltage selected from a number of output voltages previously prepared. The number of the output voltages is the same as the number of the gradation levels.

The correction circuit and the DA converter are commonly provided to all the drive circuits and light emitting elements. Therefore, these circuits do not cause the nonuniformity of the light amounts. The nonuniformity of the light amounts caused by the drive circuits, the light emitting elements, and the lens array, which are located after the DA converter, could be cancelled by correcting and adjusting the voltage signal output from the DA converter.

If a variation range of the light amounts is wide, a range of the voltage signal must be wide enough to cancel the variation. That is, the corrected gradation signal is to generate a voltage signal in a wider range than the original gradation signal.

In addition, the voltage signal is to be finely adjusted to perform a correction at a high precision. Therefore, the gradation signal after the correction is to be a signal having more gradation levels than the original gradation signal.

To widen the gradation range and increase the number of gradation levels, the bit number of the gradation signal after the correction is higher than the bit number of the original gradation signal. However, a circuit scale in a correction computation circuit or the DA converter is at least doubled as the bit number of the digital signal to be dealt with is increased by only 1 bit. The circuit scale is enormously increased along with the increase in the bit number.

SUMMARY OF THE INVENTION

The present invention provides a light emitting apparatus including: a plurality of light emitting elements; a drive circuit provided to each of the plurality of light emitting elements, including a transistor which supplies a drain current controlled by a gate-source voltage to the light emitting element and a capacitor having one end connected to the gate of the transistor; and a signal supply circuit for receiving a digital gradation signal and outputting an analog voltage signal to the drive circuit, including a memory that stores a correction coefficient for each of the plurality of light emitting elements, a computation circuit configured to correct the input digital gradation signal to generate a corrected digital gradation signal, and a digital-to-analog converter to convert the corrected digital gradation signal to the analog voltage signal, in which the drive circuit is configured to conduct an auto-zero operation in which the gate-source voltage of the transistor is reduced to a threshold voltage of the transistor by flowing the drain current to the capacitor, and the computation circuit is configured to generate the corrected digital gradation signal by multiplying the correction coefficient to the input digital gradation signal subtracted by a particular signal common to the plurality of light emitting elements.

Further features of the present invention will become apparent from the following description of exemplary embodiments with reference to the attached drawings.

DESCRIPTION OF THE EMBODIMENTS

Figure 1:
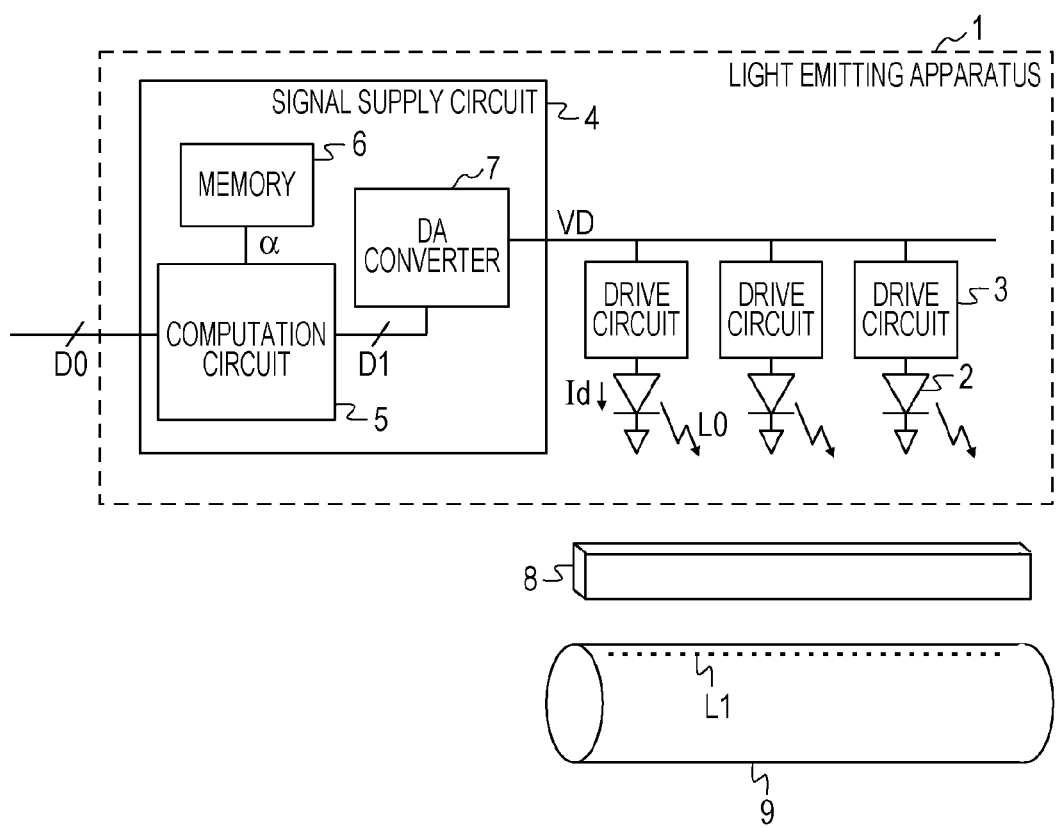
FIG. 1 is a block diagram illustrating a configuration of a light emitting apparatus according to an embodiment mode of the present invention.

FIG. 1 is a schematic diagram illustrating a configuration of a light emitting apparatus according to an embodiment mode of the present invention.

A light emitting apparatus 1 is an exposure head of an electrophotographic printer including light emitting elements such as organic EL elements, and light amounts in 16 stages are controlled by a 4-bit digital gradation signal transmitted from an external circuit such as a personal computer. In a display apparatus, the light amounts are controlled by an 8-bit or 24-bit gradation signal in more multiple stages.

Digital gradation signal D0 are transmitted from an external apparatus that is not illustrated in the drawing to the light emitting apparatus 1 in serial in the order of the arrangement of light emitting elements 2.

The transmitted gradation signal D0 is input to a correction computation circuit 5 of a signal supply circuit 4. The correction computation circuit 5 reads out a correction coefficient $\alpha$ corresponding to the input gradation signal D0 from a memory 6 and applies a correction computation on the gradation signal D0. The memory 6 stores the correction coefficients $\alpha$ of the respective light emitting elements 2 in an alignment sequence of the light emitting elements 2.

A digital gradation signal D1 corrected by the correction computation circuit 5 is converted into an analog voltage by a DA converter 7 and output from the signal supply circuit 4 as a voltage signal VD.

The voltage signal VD is input to a drive circuit 3 of the corresponding light emitting element 2 and converted into a drive current Id by the drive circuit 3. The drive current Id flows through the light emitting element 2, and the light emitting element 2 emits light.

In a case where the light emitting apparatus 1 is the display apparatus, an intensity of the light emitted from the light emitting element 2 on a display surface is a luminance L0.

In a case where the light emitting apparatus 1 constitutes the exposure head of the electrophotographic printer, the light emitted from the light emitting element 2 enters a lens array (MLA) 8 and is focused by a lens effect and imaged on a surface of a photosensitive member 9. An intensity L1 of light flux applied on the unit area of the photosensitive member surface corresponds to an index of the light amounts of the respective light emitting elements.

Hereinafter, the luminance L0 on a light emitting surface in the display apparatus or the lighting apparatus and the intensity L1 of the light flux in an exposure apparatus are both referred to as light amount and denoted by a reference symbol L.

Figure 2A:
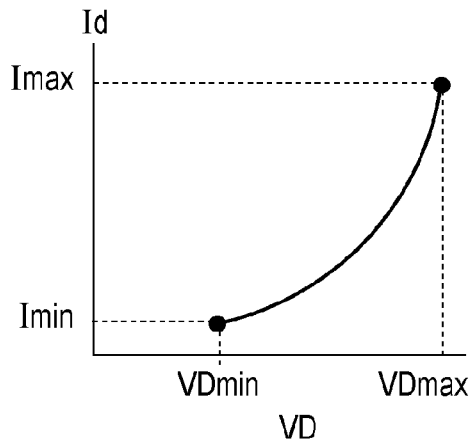
FIG. 2A illustrates a drive circuit in the light emitting apparatus according to the embodiment mode.
Figure 2B:
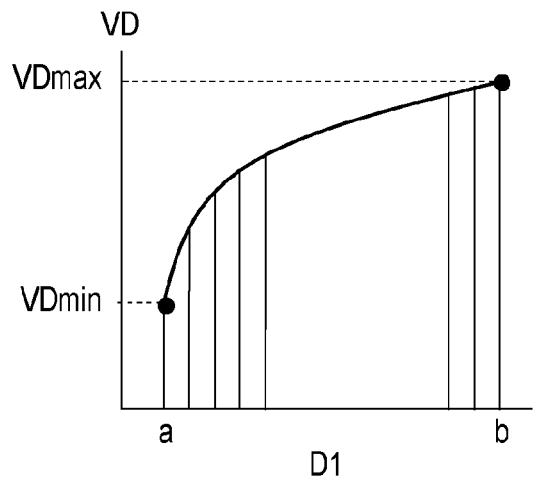
FIG. 2B illustrates an input output characteristic of a DA converter.
Figure 2C:
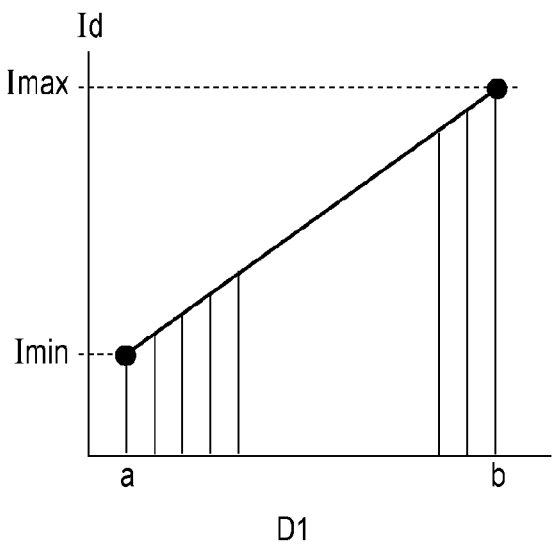
FIG. 2C illustrates a combined characteristic thereof.

A nonlinear relationship as illustrated in FIG. 2A generally exists between the voltage signal VD input to the drive circuits 3 and the generated current Id. While this nonlinearity is taken into account, the signal supply circuit 4 sets an inverted nonlinearity as illustrated in FIG. 2B between the digital input and the analog output of the DA converter 7. These two nonlinearities are combined to generate a linear relationship between the gradation signal D1 and the current Id, as illustrated in FIG. 2C.

When the nonlinear relationship also exists between the current Id generated by the drive circuit 3 and the luminance L0 of the light emitting element 2, and furthermore, when the linear relationship also exists between the light input to the lens array 8 and the outgoing light, the DA converter 7 is designed so that the linear relationship between the gradation signal D1 and the final light amount L is established while those nonlinearities are included.

Figure 3:
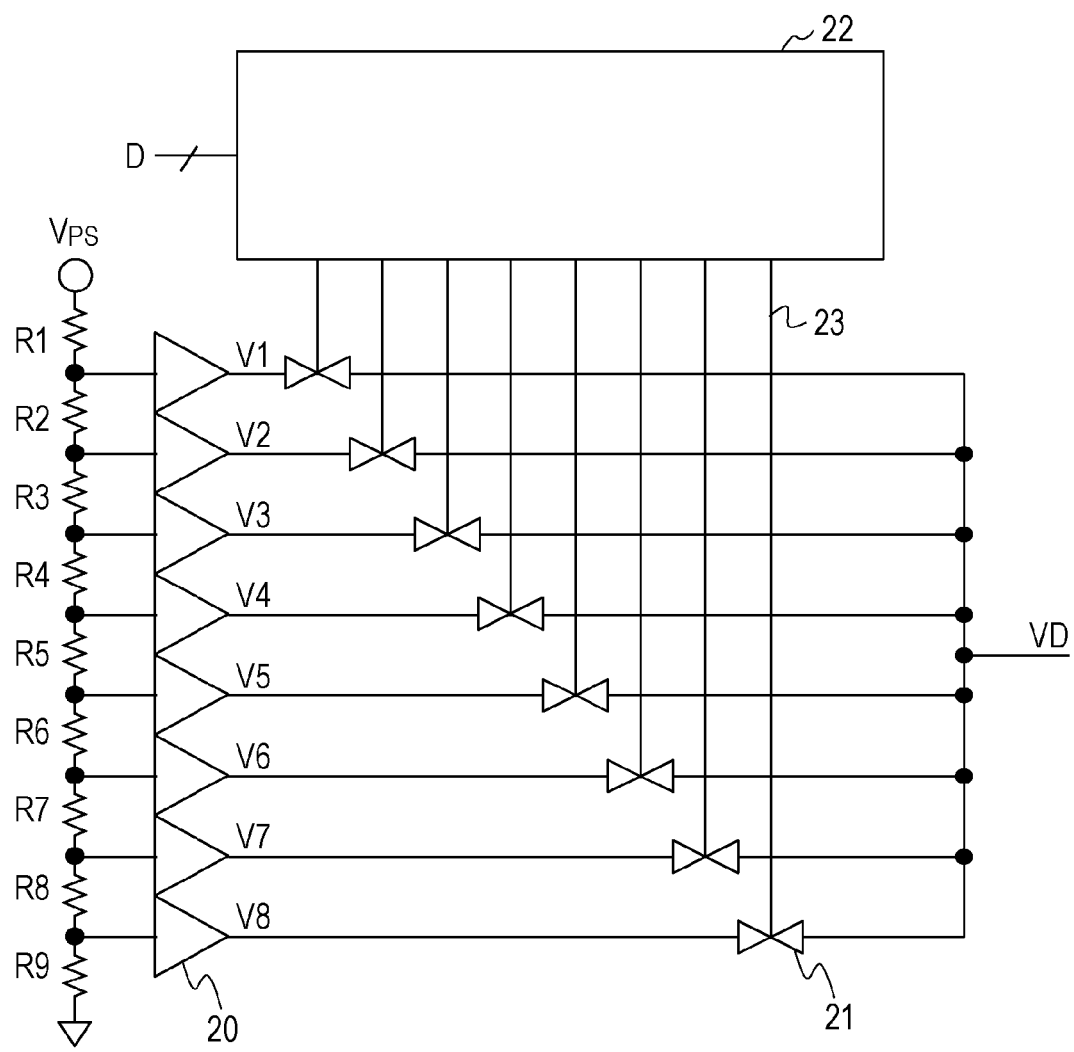
FIG. 3 illustrates a configuration of the DA converter.

FIG. 3 is a circuit diagram illustrating a configuration of the DA converter 7. Herein, a 3-bit input signal D is input, and an 8-stage output VD is used, but the configuration is unchanged even when the bit number varies.

The DA converter is configured to decode the digital input D by a decoder 22 and select one of signal lines 23 from the result, and an analog switch 21 of the selected signal line 23 is turned on, so that one of voltage levels V1 to V8 becomes the output VD. A maximum voltage Vmax and a minimum voltage Vmin are determined by adjusting resistances R1 and R9 and a power supply voltage VPS. The voltage levels V1 to V8 are determined by a resistance division between Vmax and Vmin and output from eight buffer amplifiers 20. Since a voltage interval can arbitrarily be set by values of resistances R2 to R8, a relationship between the input D and the output VD can freely be designed.

Incidentally, the light emitting apparatus 1 of FIG. 1 includes the plural light emitting elements 2 and the drive circuits 3, if the correction is not carried out, the nonuniformity of the luminance L0 is caused by the characteristic variation of the light emitting elements 2 and the characteristic variation of the drive circuits 3.

The luminance L0 of the light emitting element 2 is proportional to the current Id flowing through light emitting element 2 with a proportionality coefficient corresponding to a light emitting efficiency. The light emitting efficiency varies for each light emitting element 2. In addition, the drive circuit 3 includes a drive transistor that generates a current, and a threshold voltage of the drive transistor and a carrier mobility varies for each drive circuit 3.

In a case where the light emitting apparatus 1 is the exposure head of the electrophotographic printer, a light focus variation relying on a lens interval of the lens array (MLA) exists in addition to the characteristic variations of the drive circuits 3 and the light emitting elements 2, and the nonuniformity of the light amounts L1 on the photosensitive member 9 is further increased.

To cancel these nonuniformity, the light amount L is previously measured on the display surface or on the photosensitivity member surface for each the light emitting element 2, and the measured light amounts is stored in the memory 6, so that the correction is carried out on the input gradation signal D0 in accordance with a content of the memory. The correction is carried out by the correction computation circuit 5.

Figure 4:
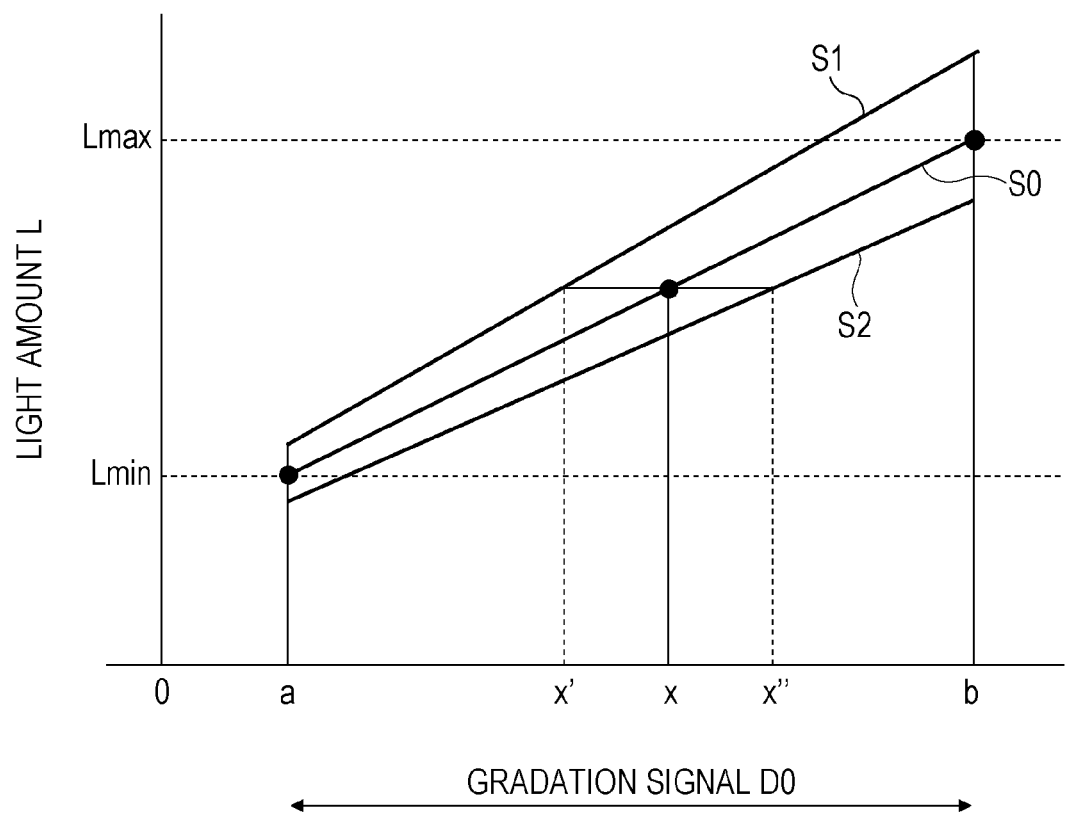
FIG. 4 illustrates a linear relationship between the gradation signal and the light amount in the light emitting apparatus according to the embodiment mode.

FIG. 4 illustrates a relationship between the gradation signals D0 input to the light emitting apparatus 1 from an external part and the light amounts L.

If a correction is not conducted on the gradation signal D0, and the gradation signal D0 is directly input to the DA converter and converted into the voltage signal, the light amounts L vary for each light emitting element 2 as denoted by S1 and S2.

With regard to a standard light amount S0, the nonlinear characteristic of the drive circuit 3 is cancelled by the inverted nonlinearity characteristic of the DA converter, and the linear relationship between the gradation signal D0 and the light amount L is established. However, the nonlinearity is not cancelled in the light emitting elements having the light amounts S1 and S2 that are deviated from the standard, and the linear relationship illustrated in FIG. 4 is not established in general because of reasons which will be described next.

The drive circuit 3 does not generate a current when the voltage signal VD is in a range that does not exceed a certain value V1. When the voltage signal VD exceeds V1, the drive circuit 3 generates a current in accordance with the exceeding amount. The generated current Id and the voltage signal VD has the following relationship:

$Id=0, \text{if } VD<V1$, $Id=A \cdot f(VD-V1), \text{if } VD \geq V1$.  (Expression 1)

In contrast to Expression 1, it is conceivable that the current is zero when VD is higher than or equal to V1 and a finite current is generated when VD is lower than V1. That is a case when a sign of VD is inverted. Hereinafter, the former case that the current flows when VD is high is argued.

V1 depends on a threshold Vth of the drive transistor and varies for each drive circuit 3. In Expression 1, f is a function determined by the configuration of the drive circuit 3. When VD is applied to the gate of the transistor and the source voltage is fixed, a drain current Id is given by the following expression:

$f(V)=V^2$.

In general, the function f is represented as $f(V)=V^\gamma$, where γ is a constant higher than 1.

In the drive circuit 3 having the characteristic of Expression 1, the output VD for the input d of the DA converter is set as follows:

$VD=f^{-1}(d)+V1$,  (Expression 2)

where $f^{-1}$ is an inverse function of f.

From Expression 1 and Expression 2, a linear relationship between the gradation signal and the current:

$Id=A \cdot d$ is established.

Since V1 includes the threshold voltage of the drive transistor, the value of V1 varies depending on the drive circuit 3. The DA converters having different settings should be prepared for the drive circuits 3 having different V1. However, since the voltage signal is transmitted from the single DA converter to the plurality of drive circuits 3 as illustrated in FIG. 1, it is impossible to establish the linear relationship between the gradation signal and the current to all of those drive circuits.

According to the embodiment mode of the present invention, a drive circuit having a configuration of automatically compensating the variation of the threshold voltages of the drive transistors is used.

In the drive circuit where the threshold voltage is compensated, the relationship between the voltage signal VD and the output current Id has the following relationship instead of Expression 1:

$Id=0 \text{ if } VD<V0$, $Id=A \cdot f(VD-V0) \text{ if } VD>V0$.  (Expression 2)

V0 does not rely on the threshold Vth, though it relies on the voltage supplied from an external part because of the power supply voltage or the operation of the drive circuit. That is, V0 takes the same value in all the drive circuits 3.

When the drive circuit has the characteristic of Expression 2, the relationship between the input d and the output VD of the DA converter 7 is set as follows:

$VD=f^{-1}(d)+V0$.  (Expression 3)

Then, all the drive circuits 3 have the following relationship:

$Id=A \cdot d$.  (Expression 4)

The coefficient A varies for each of the drive circuits 3 because of the mobility variation. Nevertheless, the linear relationship between the gradation signal d and the current Id is established.

As described above, in the drive circuits where the threshold voltage of the drive transistor is compensated, the voltage V0 at which the current generation is started is common to all the drive circuits 3. In such drive circuits, it is possible to establish the linear relationship between the gradation signals and the light amounts of the light emitting elements regardless of the variations.

Circuits proposed in U.S. Pat. No. 6,229,506 and US Patent Application no. 2007/0063932, as well as other drive circuits in related arts, can be used for the drive circuit that compensates the variation of the threshold voltages. Even if the compensation method is different from the present case, the present invention can be employed as long as the current Id is generated by the Expression 2 and V0 is common to all the drive circuits 3.

Since the current Id is proportional to the luminance L0, the above-described linear relationship between the gradation signal d and the current Id derives the linear relationship between the gradation signal d and the luminance L0. The latter relationship is maintained even when the drive circuits 3 or the light emitting elements 2 have variations. Since the incident light amount and the outgoing light amount of the lens array 8 also have the proportionality, the same argument can be applied to the light amount L1 on the photosensitive member through the lens array 8.

The gradation signal D1 input to the DA converter is obtained by correcting the gradation signal D0 transmitted from an external part in the correction computation circuit. Since the gradation signal and the light amount L have the linear relationship, the conversion from D0 to D1 can be conducted by the linear calculation. In addition, the correction computation circuit can be composed of linear computation circuits only. The linear computation circuits having a simple configuration and a high computation speed conduct the correction of the gradation signal at high accuracy and at high speed.

In the following, the correction computation circuit and the correction method will be described specifically by exemplary embodiments.

First Exemplary Embodiment

FIG. 4 denotes a relationship between the gradation signal D0 and the light amount L. Line S0 indicates the relationship with regard to a standard drive circuit and a standard light emitting element. When the collecting power of the lens array 8 varies depending on a position, a standard position is determined and the standard light amount is defined by the light amount on the photosensitive member irradiated with a light output from the standard position.

A range of the gradation signal is set from a to b, and the corresponding standard light amounts are set as Lmin and Lmax. These values are provided as specification of the light emitting apparatus 1.

If the gradation signal D0 is not corrected and directly input to the DA converter and converted into the voltage signal, then the light amount L varies like S1 or S2. The correction is conducted so that any of the light emitting elements 2 supply the same light amount S0 as the standard light emitting element. With regard to the light emitting element at S1 where the light amount is higher than the standard value, the gradation signal x is corrected to the gradation signal x'. With regard to the light emitting element at S2 where the light amount is lower than the standard value, the gradation signal x is corrected to the gradation signal x".

According to the present exemplary embodiment, a threshold compensation method proposed in U.S. Pat. No. 6,229,506 and US2007/0063932 is employed, that is, the drive circuit removes threshold voltage dependence on the current by the method of auto-zero operation.

Figure 5:
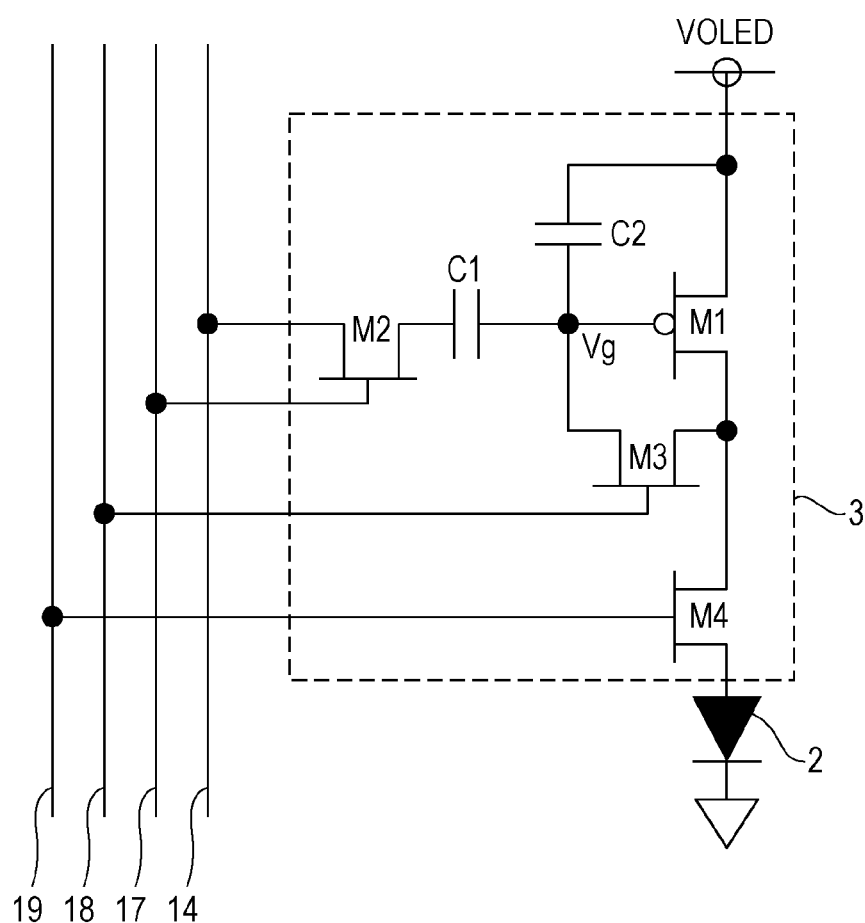
FIG. 5 is a circuit diagram of the drive circuit and a light emitting element in the light emitting apparatus according to the embodiment mode.

FIG. 5 illustrates the drive circuit according to the present exemplary embodiment, and the drive circuit is a circuit similar to FIG. 3 of U.S. Pat. No. 6,229,506. One end of a capacitor C1 is connected to a gate of a drive transistor M1, and a transistor M2 is connected between the other end of the capacitor C1 and a data line 14 where the voltage signal is transmitted. A transistor M3 is connected between the gate and a drain of the drive transistor M1, and a transistor M4 is connected between the drain of the drive transistor M1 and the light emitting element 2. The transistors M2 to M4 function as switches in which on and off are controlled by control lines 17 to 19. It is noted that a second capacitor C2 between the gate and a source of the drive transistor M1 may not be used for the threshold compensation.

Since a detail of the circuit operation is described in U.S. Pat. No. 6,229,506, the description thereof will be omitted, and a description will be given of an outline of the auto zero operation here.

The drive transistor M1 is set in a continuity state prior to the auto-zero operation.

The auto-zero operation is conducted during application of a reference voltage Vref to the data line 14. The transistor M2 functioning as a first switch and the transistor M3 functioning as a second switch are turned on, and the transistor M4 functioning as a third switch is turned off.

The drain current of the drive transistor M1 flows through the transistor M3 into the capacitor C1. This current increases the gate voltage and makes a gate-source voltage of the drive transistor M1 to be close to the threshold voltage. When a sufficient time elapses, the gate-source voltage is approximately equal to the threshold voltage, and the drain current becomes zero. Thus, an operation called auto zero is carried out.

According to the auto-zero operation, the current that flows through the transistor changes the gate voltage of the transistor itself, and the operation point is set to be close to the threshold voltage.

The transistors M3 and M4 are provided to guide the drain current to the gate of the drive transistor M1 and have configurations unique to the drive circuit that performs the auto-zero operation.

After the end of the auto-zero operation, the voltage held at the capacitor C1 includes the threshold voltage. In this state, the transistors M3 is turned off and a data voltage Vdata is supplied from the data line 14. The voltage of the capacitor C1 is equal to a multiplication of the data voltage Vdata and a capacitance division coefficient subtracted by the threshold voltage. The gate-source voltage is represented as follows:

$$Vgs=[C1/(C1+C2)]\cdot(Vref-Vdata)+Vth$$

(where the capacitance division coefficient becomes 1 when the second capacitor C2 does not exist).

While this voltage is held, when the transistors M2 and M3 are turned off and the transistor M4 is turned on, the current Id without depending on the threshold voltage is generated. In this case, since the current flows when the data voltage Vdata is lower than Vref, the resultant by inverting the sign of the voltage signal is added onto the threshold voltage.

In the drive circuit where the drive transistor of FIG. 4 is replaced by an N-channel FET, the following expression is established:

$$Vgs=[C1/(C1+C2)]\cdot(Vdata-Vref)+Vth.$$

The resultant by multiplying the voltage signal by the capacitance coefficient is added onto the threshold voltage. In either case, a voltage obtained by adding a voltage in accordance with the signal voltage (the signal voltage or the resultant obtained by inverting the sign of the signal voltage, or the resultant obtained by multiplying those by a constant) onto the threshold voltage is generated between the gate and the source of the drive transistor. As a result, the drain current that does not rely on the threshold voltage flows.

A drive circuit proposed in FIG. 1A of US2007/0063932 also corrects the variation of the threshold voltages by the auto-zero operation.

The gate and the drain of the drive transistor are short-circuited prior to the light emission, and the drain current flows through the capacitor that is connected to the gate. To elaborate, the auto-zero operation is carried out. As a result, the voltage obtained by adding the data voltage (a signed of which is inverted) onto the threshold voltage of the drive transistor is held in the capacitor.

In this case, the light emitting element is connected to the source, but in the FET, the drain current and the source current have a same value determined by the gate-source voltage.

Nonuniformity of the threshold voltage is automatically compensated in the drive circuit 3 and the width of the light amount variation is accordingly decreased, resulting in decreasing of the voltage range of the DA converter necessary for the correction.

In addition to the above, when the auto-zero operation is carried out in the drive circuit, the linear relationship between the light amount and the gradation signal of FIG. 3 becomes a straight line passing through one point. As a result, the correction computation includes only one multiplication, and the scale of the correction computation circuit is decreased. Hereinafter, this configuration will be described.

After the auto-zero operation is ended, the voltage signal VD is supplied. If the voltage signal VD is the same as the reference voltage Vref that has been supplied to the data line during the auto-zero operation, the voltage of the second capacitor C2 remains the threshold voltage, and the generated current is zero. When such a voltage signal VD (hereafter denoted by Vc) is applied, the voltages of the first capacitor and the second capacitor at the end of the auto-zero operation are not changed. The threshold voltage between the gate and the source of the drive transistor is also remained. Then, the drive circuit 3 generates the zero current. The light amount L emitted by the light emitting element is also zero.

Since the state at the end of the auto-zero operation is not affected by the influence of the mobility of the drive transistor, Vc is unchanged even when the mobility has a variation or even when the emission coefficient of the light emitting element has a variation. To elaborate, Vc is the same voltage in all the drive circuits.

Since the voltage signal exists in the range determined as illustrated in FIGS. 2A and 2B, Vc may not exist within the relevant range. However, if the range of the gradation signal is expanded and the voltage range of the DA converter is also expanded in accordance with the expansion of the range of the gradation signal, the voltage signal Vc, which supplies the light amount zero, exists and the signal c corresponding to the voltage signal Vc also exists.

As will be described below, the gradation signal D0 is redefined by setting this particular signal c as an origin. The correction on the gradation signal is determined by an inclination of the straight line representing the relation between the gradation signal and the light amount. Then, the correction circuit is also facilitated.

The above-described configuration is established not only in the drive circuit 3 of FIG. 5 but also in all the drive circuits that perform the auto-zero operation such as a drive circuit or the like proposed in US2007/0063932.

Hereinafter, a specific correction method will be described.

Figure 6:
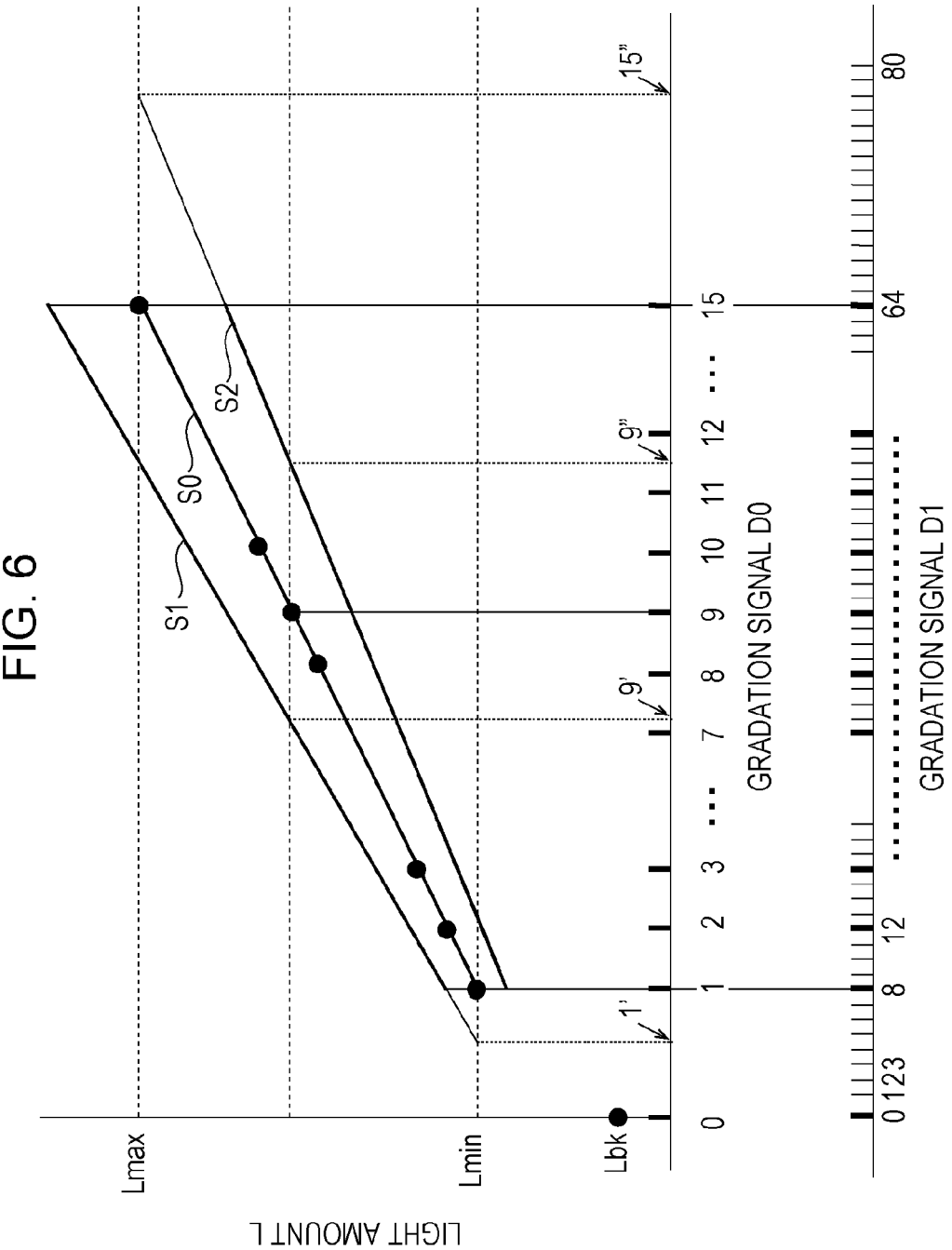
FIG. 6 illustrates a relationship between the gradation signal and the light amount and a variation thereof.

FIG. 6 illustrates a method of correcting the 0-bit gradation signal D0 into the gradation signal D1. Herein, a signal 0 is dealt with as generating a special voltage signal, and 1 to 15 supply stepwise light amounts. The horizontal axis has a scale where 1 to 15 are arranged at an equal interval. The position of the signal 0 on the horizontal axis does not have a meaning.

With regard to the light emitting element at S1 where the light amount is higher than the standard, the gradation signal 1 is corrected to 1', and with regard to the light emitting element at S2 where the light amount is lower than the standard, the gradation signal 15 is corrected to 15". As a result, the range of the corrected gradation signal D1 is wider than the range of the original gradation signal D0 (1 to 15).

While the gradation signal after the correction 9' is between the original gradation signals 7 and 8 and the gradation signal after the correction 9" is between the original gradation signals 11 and 12, the result of the correction computation may be at the middle of the original 4-bit gradation signals 1 to 15.

To cope with this, the gradation signal D1 after the correction has a wider range than the original gradation signal D0 and can also be selected from the signals having the more gradations. In the example illustrated in FIG. 6, the signal range of the original 4-bit gradation signal D0 is increased by four stages upwards and two stages downwards. Furthermore, the signal interval is equally divided into four, and the gradation signal having the 80 gradations in total is prepared. The gradation signal D1 after the correction is determined from among those. (Here, also, the signal 0 is set as a special signal.)

The gradation signal D0 input to the correction computation circuit becomes the correction computation circuit input while 1 is converted to 8, 2 is converted to 12, etc. The correction computation circuit 5 is a computation circuit that can perform 8-bit digital computation including a sign bit and output one of the 80 gradations. The DA converter 7 also includes a decoder configured to decode the digital signal having the above-described 80 gradations.

Figure 7:
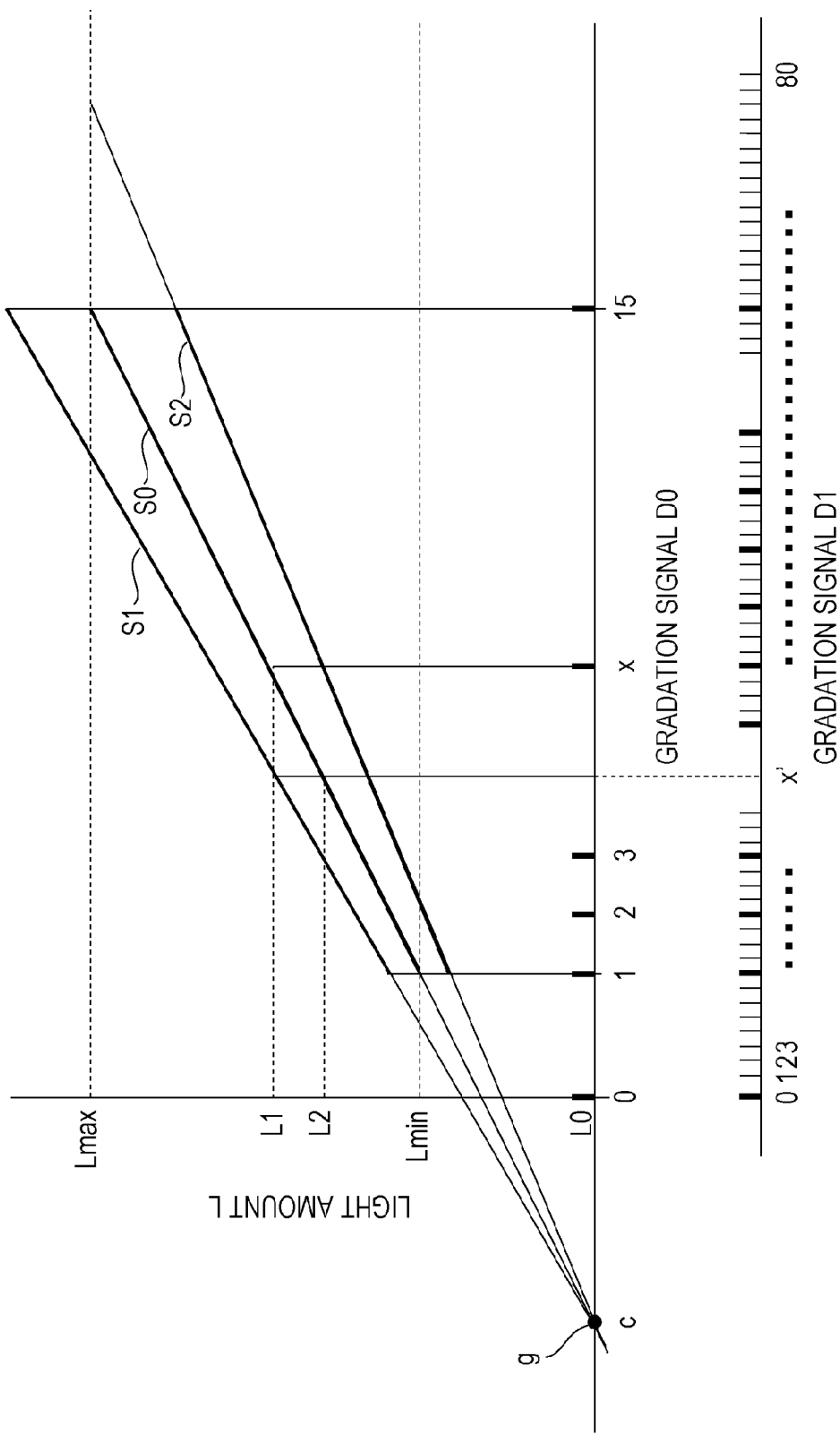
FIG. 7 illustrates a correction method according to a first exemplary embodiment.

FIG. 7 illustrates the relationship between the gradation signal and the light amount that are the same as those in FIG. 6 and is an explanatory diagram for describing how the correction is carried out. Since the drive circuit of the auto zero system is used, the relationships of the gradation signals with respect to the light amounts are all straight lines, and also all the straight lines pass a point g at the light amount zero. The horizontal axis coordinate the point g provides the signal c.

For the measurement of the light amount, it suffices if the measurement is conducted on one gradation signal arbitrarily selected from among the range of the gradation signal before the correction. Herein, the description will be given while the light amount is measured with respect to the maximum value b of the gradation signal.

The measured value of the light amount when the gradation signal b is supplied is set as Lb, and an average of the measured values of the light emitting elements is set as a standard light amount Ls. A ratio of the measured light amount with respect to the standard light amount is set as $1/\alpha$, and $\alpha$ denotes a correction coefficient:

$$\alpha = Ls/Lb. \qquad \text{(Expression 3)}$$

The correction coefficients $\alpha$ of the respective light emitting elements are stored in the memory 6.

The measurement of the light amount and the storage of the correction coefficient to the memory are conducted prior to the shipment of the product. The measurement may be conducted in a manufacturing procedure for the light emitting apparatus 1 in a state in which the light emitting element is supplied with the signal so that the light emission can be conducted.

The used light amount is determined as the specification of the light emitting apparatus 1. From the lower limit Lmin of the light amount corresponding to the minimum gradation signal except 0 and the upper limit Lmax of the light amount corresponding to the maximum gradation signal b, a coordinate c on the horizontal axis at a fixed point g is obtained as follows:

$$c=(L\max \cdot a-L\min \cdot b)/(L\max-L\min). \quad \text{(Expression 4)}$$

A constant c does not rely on the variation and is common to all the light emitting elements. The constant c can be saved in the memory 6 but can also be held in the signal supply circuit 4 in advance because this is only a single number. If −c obtained by inverting the sign of c is also held in the signal supply circuit 4, this is convenient to the following computation.

Figure 8:
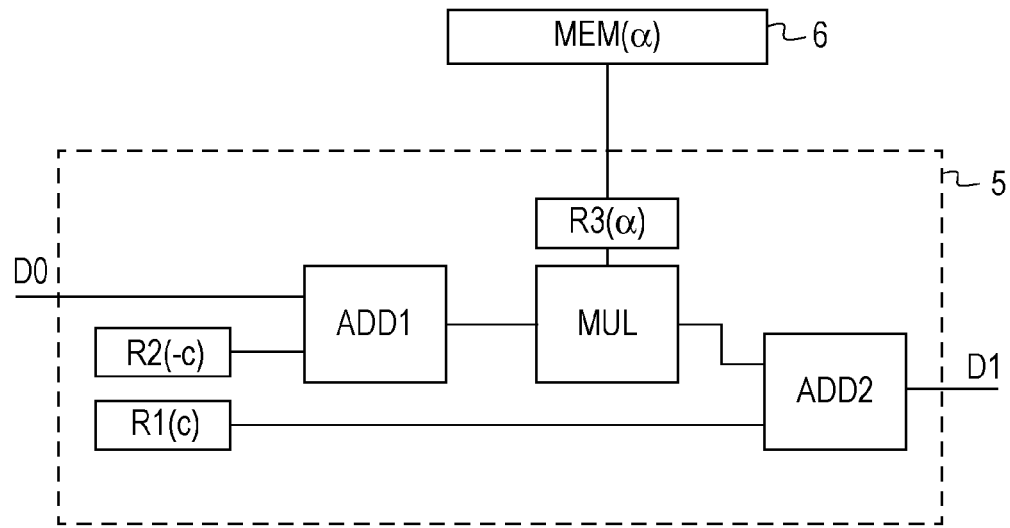
FIG. 8 is a block diagram illustrating a configuration of the correction computation circuit according to the first exemplary embodiment.

FIG. 8 is a block diagram illustrating a configuration of the correction computation circuit.

The correction computation circuit 5 is provided with registers R1 and R2 that respectively hold the particular signals c and −c, a register R3 that holds the correction coefficient α read out from the memory 6, two adders ADD1 and ADD2, and a multiplier MUL. These circuit included in the correction computation circuit deal with the 8-bit digital signal that also includes the sign bit.

When the gradation signal D0=x is input to the signal supply circuit 4, the correction computation circuit 5 accesses the memory 6 and reads out the correction coefficient α of the corresponding light emitting element to be held in the register R3. Since the input gradation signals are serial signals in the order of the arrangement of the light emitting elements on a substrate, the corresponding light emitting element can be found out from the order of the serial signals.

The adder ADD1 calculates a sum of the gradation signal x and a value (−c) of the register R2 and transmits the result x−c to the multiplier MUL.

The multiplier MUL refers to the register R3 and performs multiplication with the output result of the adder ADD1 to output the product α·(x−c). This result is transmitted to the adder ADD2.

The adder ADD2 adds the output of the multiplier to the value (c) of the register R1 and sets the result α·(x−c)+c as the output of the correction computation circuit 5.

Through the above-described computation, the gradation signal D1=x' output from the correction computation circuit is as follows:

$$x'=\alpha(x-c)+c. \quad \text{(Expression 5)}$$

While c is set as a reference, a magnitude of the gradation signal is determined from Expression 5, it is found out that the corrected gradation signal x'−c can be obtained by multiplying the gradation signal x−c by α. If the conversion to the signal in which the gradation signal is shifted by c is conducted in advance, the correction computation circuit 5 may only use the multiplier MUL.

A reason why the gradation signal x' in Expression 5 becomes the right correction of the gradation signal x will be described below.

With reference to FIG. 7 again, when the light amount in x of the standard light emitting element is set as L1 and the light amount in x' is set as L2, since x'−c is α times higher than from Expression 5, L2 is α times higher than L1. On the other hand, according to Expression 3, since a ratio of the light amounts of the light emitting elements at S1 to be corrected and the standard light amounts of the light emitting elements at S0 is 1:α, the light amount S1 in x' is 1/α times higher than L2, and this is equal to L1. Therefore, the light amount in x' of the light emitting element indicating the characteristic of S1 is equal to the light amount L1 in x of the light emitting element having the standard light amount S0. That is, x' is the signal in which x is corrected.

The original gradation signal x is a 4-bit digital signal, and the corrected gradation signal x' is an 8-bit digital signal. The light amounts L on the actual vertical axis accordingly take discrete values. The light amounts in x and x' are corrected to be equal to each other at an accuracy of one step of the discrete light amounts. Since the correction computation circuit outputs the 8-bit digital signal, the corrected gradation signal corresponds to one of the 80 gradations in FIG. 7 and does not supply an intermediate light amount of the discrete light amounts.

Modified Examples

One constant c that does not rely on the single correction coefficient α and the light emitting element is used to carry out the correction in (Expression 5). The memory saves one correction coefficient per the light emitting element.

The following expression is obtained by transforming Expression 5:

$$x'=\alpha \cdot x+(1-\alpha) \cdot c. \quad \text{(Expression 6)}$$

Through Expression 6, the correction may be conducted in a manner that the input gradation signal x is multiplied by the correction coefficient α, and the following constant is added to the result:

$$\beta=(1-\alpha) \cdot c. \quad \text{(Expression 7)}$$

In this case, the first computation of adding −c is not conducted, and the register R2 is not used. Instead, a circuit configured to calculate β each time when α is read out is employed.

Both α and β may also be held in the memory instead of calculating β. The memory capacity is doubled, but the correction computation circuit performs only two stages including the multiplication of α by x and the addition of β to the result.

Figure 9:
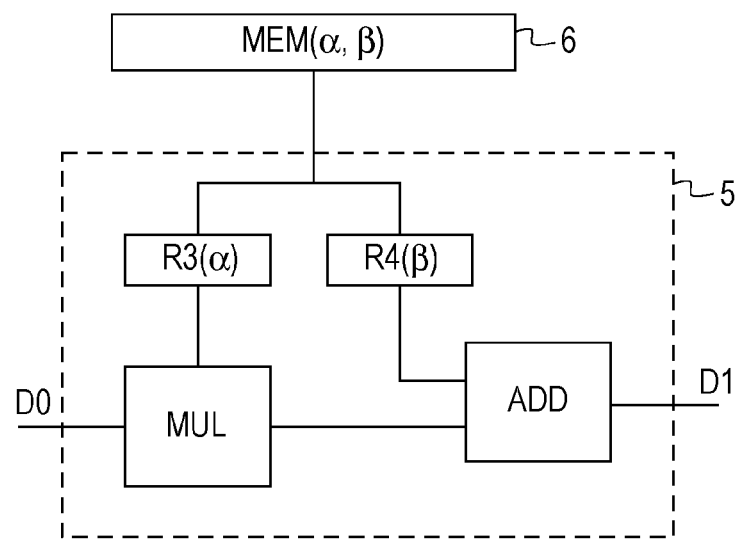
FIG. 9 is a block diagram illustrating configurations of the correction computation circuit according to a modified example of the first exemplary embodiment and a second exemplary embodiment.

FIG. 9 illustrates the correction computation circuit in a system where the two correction coefficients α and β are stored in the memory and read out from the memory. The correction computation circuit includes the adder ADD and the multiplier MUL and the two registers R3 and R4. When the gradation signal D0 is input, the correction computation circuit first reads out the correction coefficients α and β of the corresponding light emitting elements from the memory and holds them in the registers R3 and R4, respectively. Subsequently, the input gradation signal D0 is input to the multiplier MUL, and the multiplier MUL fetches the value of the register R3, i.e. α, and multiplies it with x. The multiplication result α·x is input to the adder ADD. The adder ADD adds the multiplication result α·x to the value of the register R4, i.e. β, and output the resultant as the correction computation result.

The correction method and the configuration of the correction computation circuit are not limited to the above-described examples. Any circuit configuration may also be adopted so long as the input gradation signal x and the constant signal c is multiplied by an appropriate coefficient, and the linear computation for the addition can be conducted.

Second Exemplary Embodiment

Assume that the relationship between the voltage signal V of the drive circuit and the generated current I is represented by the following expression:

$$I=A \cdot V^{\gamma}. \quad \text{(Expression 8)}$$

Then, a relationship between the input digital signal d and the output analog voltage VD of the DA converter 7 is set so as to establish the following expression:

$$V = B \cdot d^{1/\gamma}.$$ (Expression 9)

In the actual drive circuit, the exponent γ in Expression 8 may also vary. On the other hand, γ of the DA converter 7 in Expression 9 is set at the output voltage level and is thus common to all the drive circuits. Therefore, the value of γ of the drive circuit may be different from the value of γ of the DA converter 7 depending on the drive circuit, and the linear relationship is not established. Hereinafter, the correction method in the above-described case will be described.

Figure 10:
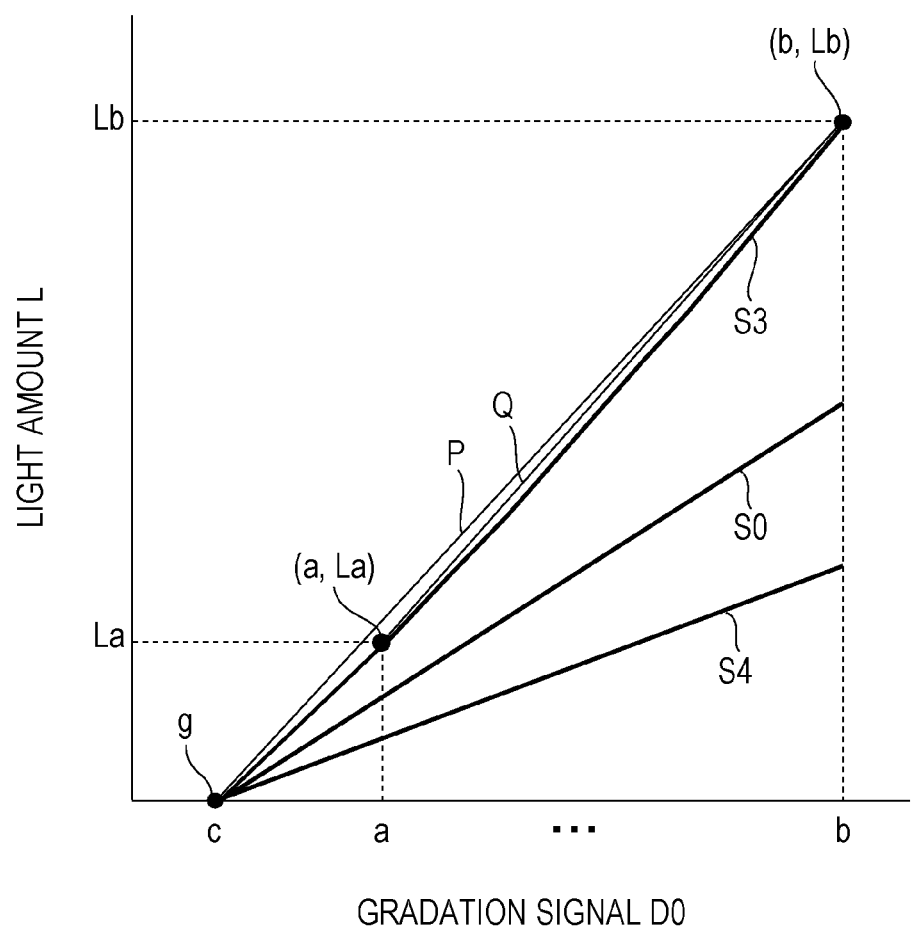
FIG. 10 illustrates a relationship between the gradation signal and the light amount when gamma values have variations according to the second exemplary embodiment.

FIG. 10 illustrates how the relationship between the gradation and the light amount changes with respect to the variation of γ. In the drive circuit having the standard γ=γ0, the linear relationship between the gradation and the light amount S0 is maintained by the DA converter 7, but the relationship between the gradation and the light amount of the drive circuit having γ deviated from it is deviated from the straight line like S3 in the case of γ>γ0 or S4 in the case of γ<γ0.

When the drive circuit performs the auto-zero operation, even if γ varies, the relationship of the gradation with respect to the light amount passes the fixed point g.

When the light amount Lb is measured by the single gradation signal b, while the average value is obtained and the correction coefficient α is determined on the basis of Expression 3, α is an inclination of a straight line P that connects a point (b, Lb) and the fixed point g. However, the straight line P is deviated from the actual the characteristic curve S3, and the correction accuracy is low. If the correction is conducted where the fixed point g is set as the reference, the accuracy is rather deteriorated.

In view of the above, the light amount La is also measured with regard to another gradation signal (which is denoted by a) in the range of the gradation signal, and the correction is conducted on the basis of a straight line Q that connects points (a, La) and (b, Lb).

When the determined range of the light amount (from Lmin to Lmax) does not include L0, the fixed point g is out of the range of the gradation signal. Thus, the straight line Q is closer to the actual characteristic S3 than the straight line P. Therefore, the accuracy is increased when the correction is conducted by the straight line Q instead of the straight line P.

The two points for measuring the light amount may not be a and b. Other points existing between a and b can be selected.

Figure 11:
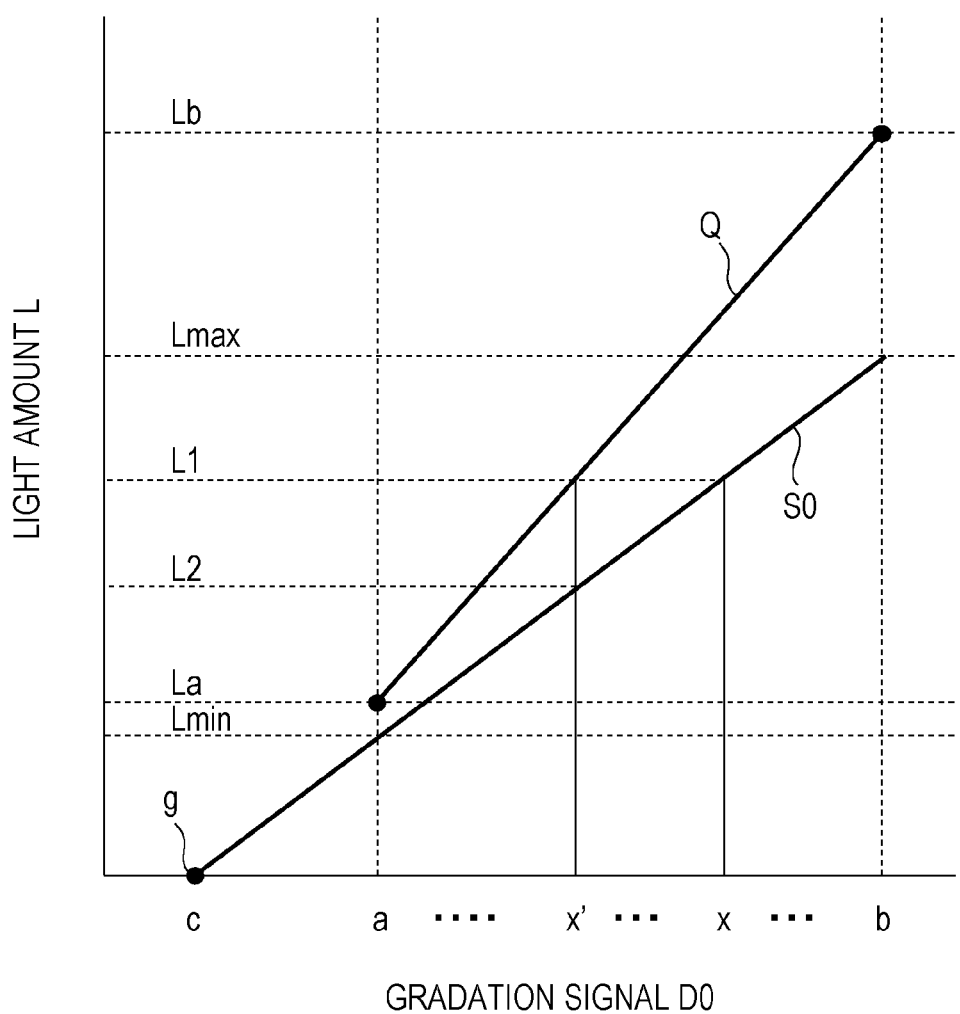
FIG. 11 illustrates a correction method according to the second exemplary embodiment.

FIG. 11 is an explanatory diagram for describing a correction method with regard to the curve S3 of FIG. 10.

The values of the light amounts measured with regard to the gradation signals a and b are set as La and Lb. The light amount averaged with regard to all the light emitting elements is set as Lmin and Lmax, and a straight line that connects between Lmin and Lmax is set as the light amount S0. Alternatively, one light emitting element where the gradation and the light amount have the linear relationship is selected, and the light amount in a and b thereof may be set as Lmin and Lmax.

The light amount L1 in the gradation signal x along the straight line S0 is represented as follows:

$$L1 = [(Lmax - Lmin)/(b-a)] \cdot (x-a) + Lmin.$$ (Expression 10)

While the light amount in the gradation signal x' along the straight line Q is the same as L1, the following expression:

$$L1 = [(Lb - La)/(b-a)] \cdot (x'-a) + La$$ (Expression 11)

is established.

The relationship between x and x' is represented from Expressions 7 and 8 as follows:

$$x' = \alpha \cdot x + \beta.$$ (Expression 12)

It is however noted that α and β herein are different from α and β in Expression 3 and Expression 7 as described below:

$$\alpha = (Lmax - Lmin)/(Lb - La), \text{ and}$$ (Expression 13)

$$\beta = [(Lb - Lmax) \cdot a - (Lmin - La) \cdot b]/(Lb - La).$$ (Expression 14)

Since α in Expression 13 and β in Expression 14 depend on the light amounts La and Lb of the individual light emitting elements, both are saved in the memory. Hereinafter, α is referred to as first correction coefficient, and β is referred to as the second correction coefficient.

The two parameters α and β are used for the correction, but the same correction computation circuit illustrated in FIG. 8 can be used, and a simple configuration composed of the multiplier and the adder is realized.

The light amount may be measured with regard to three or more gradation signals. In addition, the gradation signal is separated into areas, and the correction coefficients α and β can also be obtained in the respective areas.

Figure 12:
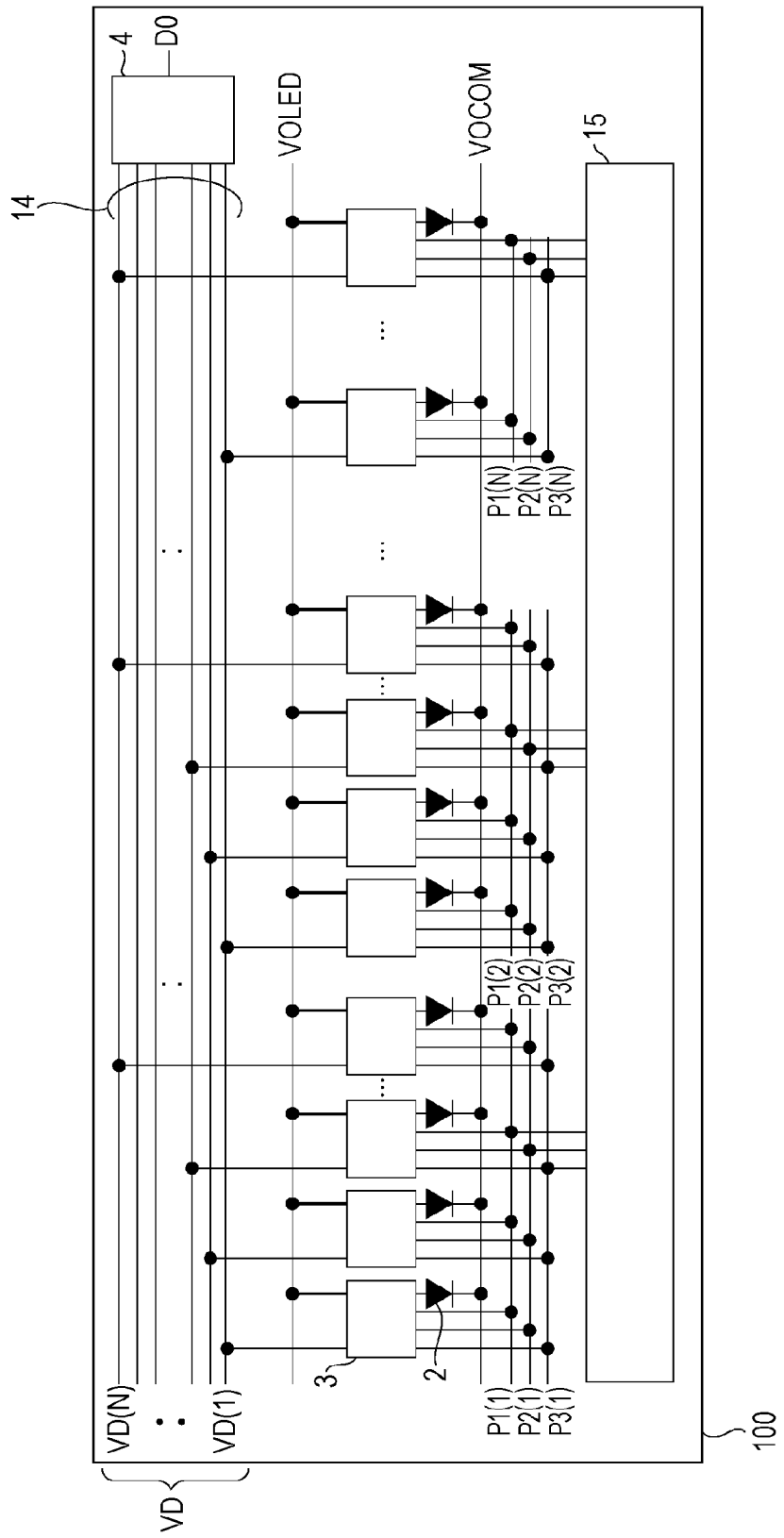
FIG. 12 illustrates a circuit and wirings on a substrate of an exposure head according to the embodiment mode of the present invention.

Other aspects common to the first and second exemplary embodiments will be described below. Configuration of the light emitting apparatus FIG. 12 illustrates a configuration of the exposure head of the electrophotographic printer.

The light emitting elements 2 composed of organic EL elements, the drive circuits 3 configured to supply currents to the respective organic EL elements, the data line 14 through which the voltage signal is transmitted to the drive circuit 3, and a control circuit 15 configured to supply control signals to the drive circuits 3 via control signal lines P1, P2, and P3 are arranged on a substrate 100. The organic EL elements 2 and the drive circuits 3 form a block by every n pieces each, and write of the voltage signal VD is conducted in time division for each block.

The gradation signal D0 is input from an external part to the signal supply circuit 4 connected to the substrate 100. The gradation signal D0 is a 4-bit digital signal and instructs the light amount of the light emitting element 2 in 16 stages. The gradation signals corresponding to the respective light emitting elements 2 are input in serial.

Figure 13:
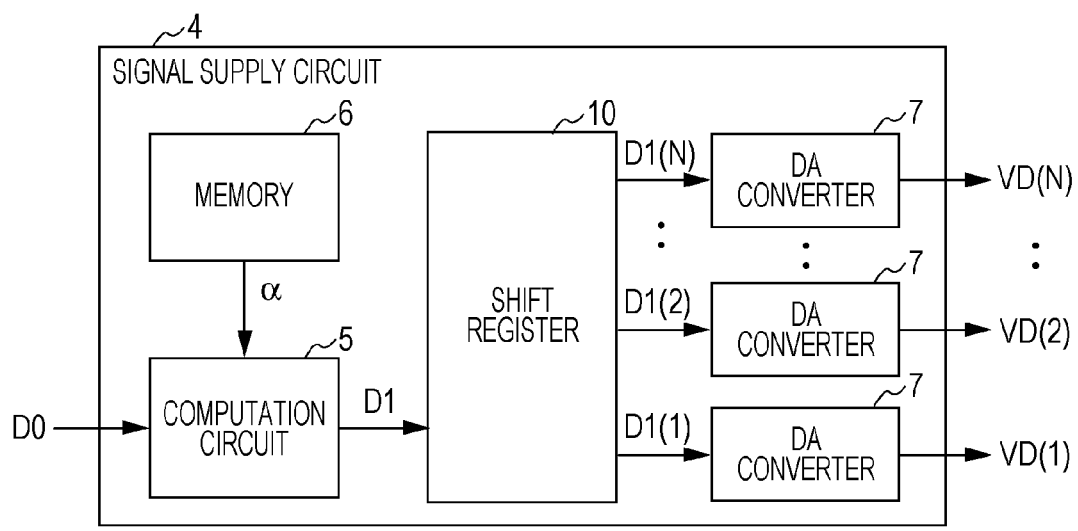
FIG. 13 is a block diagram illustrating a configuration of a signal supply circuit arranged on the substrate of the exposure head.

FIG. 13 illustrates a configuration of the signal supply circuit 4. The light emitting elements 2 of the exposure head constitute blocks by every N pieces and are driven in the unit of the block, and the signal supply circuit 4 of FIG. 13 is obtained by adding an N-stage shift register 10 to the configuration of FIG. 1 and providing the DA converter 7 for each output stage of the shift register.

The corrected gradation signal D1 in the correction computation circuit 5 is separated into parallel signals D1 (1) to D1 (N) by the shift register 10 and input to the DA converter 7. The N pieces of DA converters 7 supply the data lines VD(1)-VD(N) with the voltage signals VD(1)-VD(N).

The gradation signal D0 can also be generated by a controller that is not illustrated on the drawing and that is mounted to the substrate 100 through a COG method and output to the signal supply circuit 4. The drive circuit 3 and the organic EL element are formed by way of thin films on the substrate 100, but the drive circuit 3 may be formed by a silicon substrate, and the organic EL element may be formed on the drive circuit 3.

How the Gradation Signal is Supplied

The n-bit gradation signal takes a value from 0 to dn=$2^n$−1. In the display apparatus, the signal 0 is not treated specially, the gradation signals having the constant increase in the light amount from 0 to dn are used.

In the case of the electrophotographic printer, the signal 0 (zero) is treated as a special signal. The signal 0 is separately set besides the gradation signals 1 to dn so that a black level, that is, a darkest light amount Lbk is supplied.

The gradation signals 1 to dn have the linear relationship with the light amounts. To elaborate, when the gradation signals 1, 2, ..., dn are arranged at an equal interval, the light amounts corresponding to the respective gradation signals are arranged in a straight line manner.

The black level Lbk is specially set and may or may not exist on this straight line.

In the electrophotographic printer, lower limit of the exposure intensity of the photosensitive member is set at a finite value of the light amount, and Lmin is not zero. When the signal for increasing the light amount stepwise from 0 is used similarly as in the display apparatus, the gradation signals from 0 to Lmin are useless signals that are not used in actuality. In order that the bit number of the gradation signal is suppressed to low, the useless signals may be eliminated, and the gradation signals are to be allocated to the used range of the light amount.

It is however noted that the signal having the gradation 0 is prepared so that the wasteful light emission is not carried out during a print pause. This is why the gradation signal of FIG. 4 deals with 0 as a special level.

Correction Accuracy

The correction accuracy is determined on the basis of "fineness" of the gradation signal after the correction, that is, the interval of the light amounts that take the discrete values. According to the first exemplary embodiment, the correction is conducted by the gradation signal having the 80 stages. To increase the correction accuracy, the interval of the light amounts is to be further decreased, but to achieve that, the bit number of the gradation signal is increased, and the circuit scale of the correction computation circuit 5 and the DA converter 7 is enlarged.

When the light amount variation is further increased, the range of the corrected gradation signal is to be widened. If the interval of the gradations, which determines the correction accuracy, is maintained and the gradation signal number is increased, the bit number of the gradation signal is increased, and the circuit scale is enlarged. Since the variation range of the light amounts can be suppressed to a low level when the drive circuit 3 of the auto-zero system is used, it is possible to avoid the increase in the bit number of the gradation signal.

Adjustment on the upper limit and the lower limit of the light amount

The maximum value VDmax and the minimum value VDmin of the voltage signal are set as the maximum voltage and the minimum voltage of the DA converter 7. When the sensitivity of the photosensitive drum is decreased and the maximum luminance Lmax is to be increased, the maximum voltage of the DA converter 7 is increased, and the gradation number of the gradation signal need not be increased. Even when the maximum luminance Lmax is increased, the linear relationship of the light amount L1 with respect to the gradation signal is not changed.

The lower limit value Lmin of the luminance output from the exposure head may be changed because of the change in the photosensitive characteristic of the photosensitive drum in some cases. The electrophotographic printer is provided with a function of adjusting Lmin.

A method for this change without using the memory rewrite or the decrease in the correction accuracy will be described below.

Figure 14:
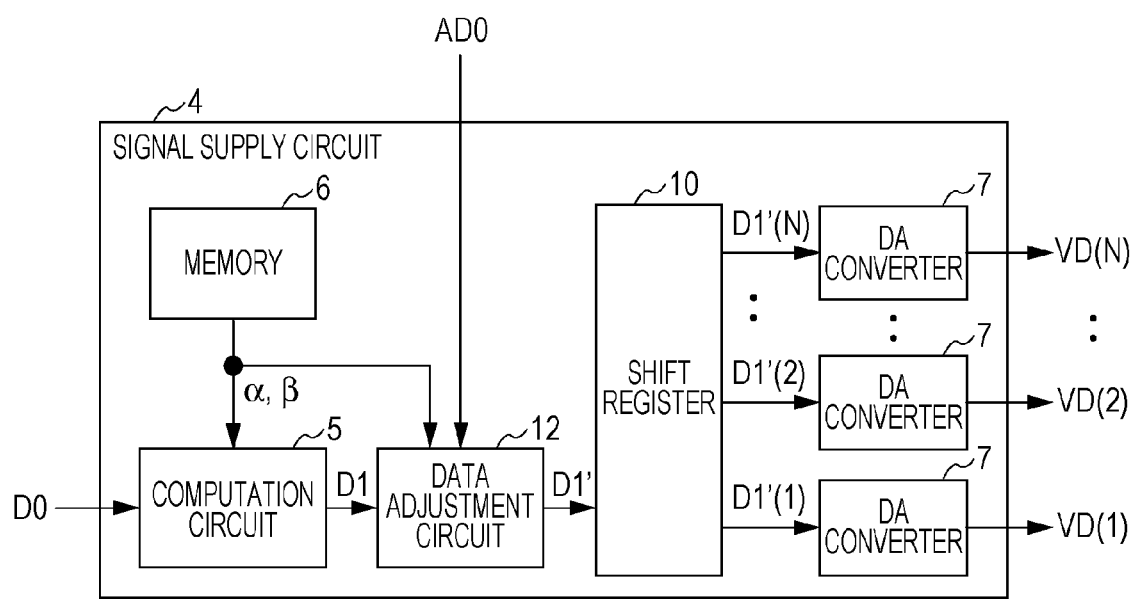
FIG. 14 is a block diagram illustrating a configuration of a signal supply circuit in which the gradation signal can be converted along with a change in an exposure light amount range.

FIG. 14 illustrates a configuration where a data adjustment circuit 12 for the minimum luminance adjustment is added in the signal supply circuit 4. The same part as in that in FIG. 1 is assigned with the same reference symbol.

The data adjustment circuit 12 is a circuit configured to determine the minimum light amount Lmin' on the basis of the adjustment data AD0 input from the external part and perform conversion computation on the gradation signal in accordance with the determined minimum light amount Lmin'. In FIG. 14, the data adjustment circuit 12 is connected between the correction computation circuit 5 and the DA converter 7, but in a case where the shift register 10 exists before the DA converter, the data adjustment circuit 12 is placed before the shift register 10. The data adjustment circuit 12 may also be connected to a part before the correction computation circuit 5.

The correction coefficients α and β are calculated by using the value of the minimum luminance Lmin and written in the memory 6. The adjustment data AD0 has a role of changing the minimum luminance from Lmin to Lmin' without rewriting the correction coefficients saved in the memory 6. It is noted that the maximum luminance Lmax is not changed.

Figure 15:
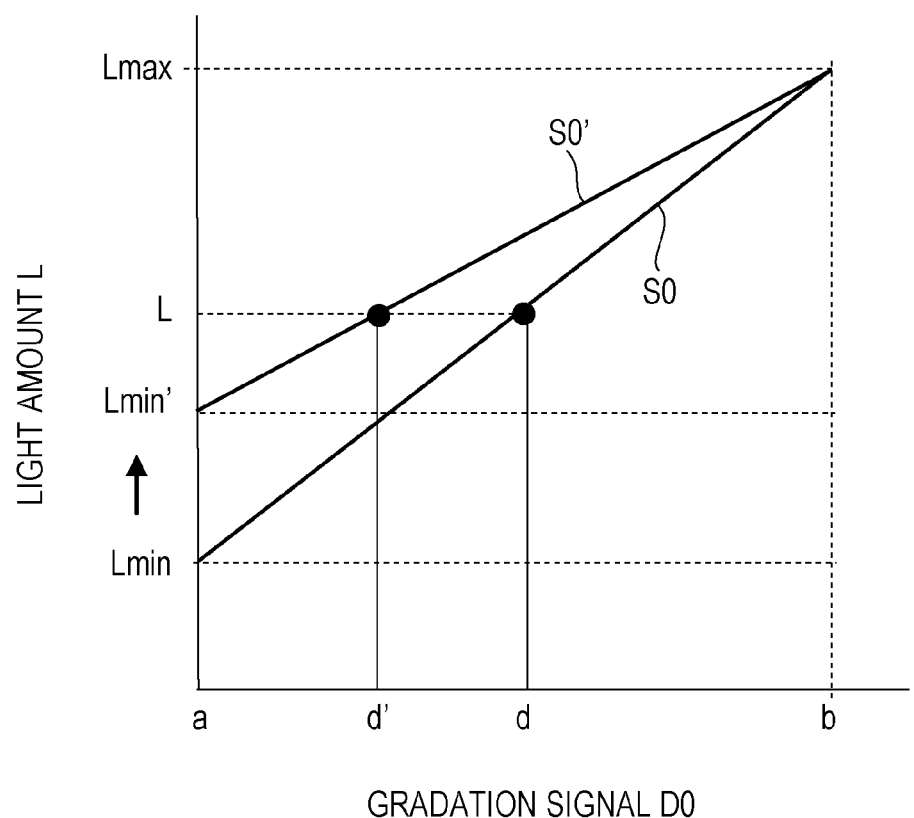
FIG. 15 illustrates a conversion method for the gradation signal along with the change in the exposure light amount range.

FIG. 15 illustrates a manner how the gradation signal is converted when the minimum luminance Lmin is changed to Lmin'.

The light amount is set as the standard S0 by the correction on the gradation signal before the change of the minimum luminance.

When the minimum luminance is changed from Lmin to Lmin', the corrected gradation signal d is converted to the gradation signal d' that supplies the same light amount L. The gradation signal d' after the conversion is as follows:

$$d' = [(Lmax - Lmin)/(Lmax - Lmin')] \cdot d + [(Lmin - Lmin')/(Lmax - Lmin')] \cdot dn.$$

Since Lmax and Lmin are previously determined values and Lmin' is the set value, the coefficient of d corresponding to the first term and the second term on the right hand side are found out. The gradation signal d' after the conversion is obtained by applying the linear computation on the corrected gradation signal d before the conversion by using these values. This computation can be executed by the data adjustment circuit 12 having the same configuration as the correction computation circuit 5 according to the first exemplary embodiment or the second exemplary embodiment.

Through the above-described method it is possible to change the minimum luminance in accordance with the change in the photosensitive characteristic of the photosensitive drum by the computation conducted by the data adjustment circuit 12 without rewriting the memory.

APPLICATIONS

The light emitting apparatus according to the exemplary embodiment of the present invention is applied to the exposure head of the electrophotographic printer and may also be used as an active matrix type display apparatus where the pixels are arranged in a matrix.

The nonuniformity of the luminance is caused while the drive transistors or the characteristics of the light emitting elements have variations in the display apparatus too. While the present invention is employed, the threshold voltage of the drive transistor is compensated in the drive circuit 3, and the gradation signal is corrected on the basis of the measurement of the luminance, so that it is possible to realize the display apparatus having the uniform luminance.

The present invention can also be applied to electronic devices such as a digital camera or a mobile information device that is provided with the display apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-050557, filed Mar. 13, 2013, which is hereby incorporated by reference herein in its entirety.

What is claimed is:

1. A light emitting apparatus comprising:
a plurality of light emitting elements;
a drive circuit provided to each of the plurality of light emitting elements, including a transistor which supplies a drain current controlled by a gate-source voltage to the light emitting element and a capacitor having one end connected to the gate of the transistor; and
a signal supply circuit for receiving a digital gradation signal and outputting an analog voltage signal to the drive circuit, including a memory that stores a correction coefficient for each of the plurality of light emitting elements, a computation circuit configured to correct the input digital gradation signal to generate a corrected digital gradation signal, and a digital-to-analog converter to convert the corrected digital gradation signal to the analog voltage signal,
wherein the drive circuit is configured to conduct an auto-zero operation in which the gate-source voltage of the transistor is reduced to a threshold voltage of the transistor by flowing the drain current to the capacitor, and
wherein the computation circuit is configured to generate the corrected digital gradation signal by multiplying the correction coefficient to the input digital gradation signal subtracted by a particular signal common to the plurality of light emitting elements.

2. The light emitting apparatus according to claim 1, wherein the correction coefficient is determined by a ratio of the light amount of the light emitting element and a standard light amount.

3. The light emitting apparatus according to claim 1, wherein the drive circuit has a configuration of short-circuiting the gate and the drain of the transistor and performing operation of flowing the drain current in the capacitor prior to the supply of the drain current to the light emitting element, and the particular signal is a signal to make the gate-source voltage of the transistor equal to the gate-source voltage at the end of the auto-zero operation.

4. The light emitting apparatus according to claim 1, wherein the drive circuit includes a first switch that connects the other terminal of the capacitor to a data line where the voltage signal is transmitted from the signal supply circuit, a second switch that connects between a gate and a drain of the transistor, and a third switch that connects the drain of the transistor to the light emitting element.

5. The light emitting apparatus according to claim 1, wherein the computation circuit includes a multiplier configured to multiply the correction coefficient to the input digital gradation signal subtracted by the particular signal and an adder configured to add the particular signal to an output of the multiplier.

6. The light emitting apparatus according to claim 1, wherein the memory further stores a second correction coefficient, and the computation circuit includes a multiplier configured to multiply the correction coefficient to the input digital gradation signal subtracted by the particular signal and an adder configured to add the second correction coefficient to an output of the multiplier.

7. The light emitting apparatus according to claim 1, wherein the computation circuit has a configuration capable to deal with a digital signal having a higher bit number than a bit number of the input gradation signal.

8. A manufacturing method for the light emitting apparatus according to claim 1, the method comprising:
measuring a light amount of each of the plurality of light emitting elements; and
storing a ratio of the measured value of the light amount and the standard light amount in the memory.

9. The manufacturing method for the light emitting apparatus according to claim 8, further comprising:
measuring a light amount of each of the plurality of light emitting elements with respect to two of the gradation signals; and
storing the correction coefficients in the memory.

10. A printer comprising:
the light emitting apparatus according to claim 1;
a lens array that focuses light emitted by the light emitting element; and
a photosensitive member irradiated with the light focused by the lens array.

11. A manufacturing method for the printer according to claim 10, the manufacturing method comprising:
measuring a light amount of each of the plurality of light emitting elements by an intensity of the light at a surface of the photosensitive member; and
storing a ratio of the measured light amount to a standard light amount in the memory.

12. The method according to claim 8, wherein the correction coefficient is determined by a ratio of the light amount of the light emitting element and a standard light amount.

13. The method according to claim 8, wherein, in the apparatus, the drive circuit has a configuration of short-circuiting the gate and the drain of the transistor and performing operation of flowing the drain current in the capacitor prior to the supply of the drain current to the light emitting element, and the particular signal is a signal to make the gate-source voltage of the transistor equal to the gate-source voltage at the end of the auto-zero operation.

14. The method according to claim 8, wherein in the apparatus, the drive circuit includes a first switch that connects the other terminal of the capacitor to a data line where the voltage signal is transmitted from the signal supply circuit, a second switch that connects between a gate and a drain of the transistor, and a third switch that connects the drain of the transistor to the light emitting element.

15. The method according to claim 8, wherein in the apparatus, the computation circuit includes a multiplier configured to multiply the correction coefficient to the input digital gradation signal subtracted by the particular signal and an adder configured to add the particular signal to an output of the multiplier.

16. The method according to claim 8, wherein in the apparatus, the memory further stores a second correction coefficient, and the computation circuit includes a multiplier configured to multiply the correction coefficient to the input digital gradation signal subtracted by the particular signal and an adder configured to add the second correction coefficient to an output of the multiplier.

17. A light emitting apparatus comprising:
a plurality of light emitting elements;
a drive circuit provided to each of the plurality of light emitting elements, including a transistor which supplies a drain current controlled by a gate-source voltage to the light emitting element and a capacitor having one end connected to the gate of the transistor; and a signal supply circuit for receiving a digital gradation signal and outputting an analog voltage signal to the drive circuit, including a computation circuit configured to correct the input digital gradation signal to generate a corrected digital gradation signal, and a digital-to-analog converter to convert the corrected digital gradation signal to the analog voltage signal, wherein the drive circuit is configured to conduct an auto-zero operation in which the gate-source voltage of the transistor is reduced to a threshold voltage of the transistor by flowing the drain current to the capacitor, wherein the digital-to-analog converter generates the analog voltage signal being set so as to establish a linear relationship between the corrected digital gradation signal and light amount of the light emitting elements, and wherein the computation circuit is configured to conduct a linear calculation with the input digital gradation signal.

18. The light emitting apparatus according to claim 17, wherein the signal supply circuit includes a memory that stores a correction coefficient for each of the plurality of light emitting elements, and the computation circuit multiplies the correction coefficient to the input digital gradation signal subtracted by a particular signal common to the plurality of light emitting elements.

19. The light emitting apparatus according to claim 17, wherein the drive circuit has a configuration of short-circuiting the gate and the drain of the transistor and performing operation of flowing the drain current to the capacitor prior to the supply of the drain current to the light emitting element, and the particular signal is a signal to make the gate-source voltage of the transistor equal to the gate-source voltage at the end of the auto-zero operation.

20. The light emitting apparatus according to claim 17, wherein the drive circuit includes a first switch that connects the other terminal of the capacitor to a data line where the analog voltage signal is transmitted from the signal supply circuit, a second switch that connects between the gate and the drain of the transistor, and a third switch that connects the drain of the transistor to the light emitting element.

* * * * *